(12) United States Patent
Ortiz

(10) Patent No.: US 12,098,598 B2
(45) Date of Patent: Sep. 24, 2024

(54) CABLE PROTECTOR CLAMP ASSEMBLY

(71) Applicant: Prysmian S.p.A., Milan (IT)

(72) Inventor: David Ortiz, Cleveland, TX (US)

(73) Assignee: Prysmian S.p.A., Milan (IT)

( * ) Notice: Subject to any disclaimer, the term of this patent is extended or adjusted under 35 U.S.C. 154(b) by 438 days.

(21) Appl. No.: 17/395,650

(22) Filed: Aug. 6, 2021

(65) Prior Publication Data

US 2023/0039223 A1    Feb. 9, 2023

(51) Int. Cl.
*F16L 3/10* (2006.01)
*E21B 17/02* (2006.01)
*E21B 17/10* (2006.01)

(52) U.S. Cl.
CPC ........ *E21B 17/026* (2013.01); *E21B 17/1035* (2013.01); *F16L 3/1075* (2013.01)

(58) Field of Classification Search
CPC ... E21B 17/026; E21B 17/1035; F16L 3/1075
USPC .......................................................... 138/103
See application file for complete search history.

(56) References Cited

U.S. PATENT DOCUMENTS

| | | | | |
|---|---|---|---|---|
| 6,023,027 A | * | 2/2000 | Neff | E21B 17/1035 |
| | | | | 174/136 |
| 9,752,392 B2 | * | 9/2017 | Semple | E21B 43/128 |
| 2007/0231074 A1 | * | 10/2007 | Cupolillo | E21B 17/1035 |
| | | | | 405/184.4 |
| 2010/0243272 A1 | * | 9/2010 | Coronado | E21B 17/1035 |
| | | | | 166/380 |
| 2014/0014373 A1 | * | 1/2014 | Richards | E21B 17/1035 |
| | | | | 166/242.6 |
| 2014/0102806 A1 | * | 4/2014 | Millet | E21B 47/12 |
| | | | | 175/315 |
| 2015/0337605 A1 | * | 11/2015 | Longbottom | E21B 17/026 |
| | | | | 166/380 |
| 2016/0047174 A1 | * | 2/2016 | O'Brien | E21B 17/1035 |
| | | | | 166/243 |
| 2016/0097243 A1 | | 4/2016 | Noakes et al. | |
| 2016/0215902 A1 | | 7/2016 | Michelet et al. | |
| 2016/0290835 A1 | * | 10/2016 | McCoy | G01D 5/353 |
| 2017/0260815 A1 | * | 9/2017 | Levie | E21B 19/16 |
| 2018/0283166 A1 | * | 10/2018 | McCoy | E21B 17/026 |
| 2020/0032593 A1 | * | 1/2020 | Serafinchan | E21B 17/1035 |
| 2021/0108741 A1 | * | 4/2021 | Hagen | E21B 17/1035 |

FOREIGN PATENT DOCUMENTS

| | | |
|---|---|---|
| EP | 3819459 A1 | 5/2021 |
| GB | 2572832 A | 10/2019 |
| WO | 9411609 A1 | 5/1994 |
| WO | 2006005895 A1 | 1/2006 |
| WO | 2016190747 A1 | 12/2016 |

* cited by examiner

*Primary Examiner* — David R Deal
(74) *Attorney, Agent, or Firm* — Slater Matsil, LLP

(57) ABSTRACT

A cable protector clamp assembly that includes a clamp body configured to hold and align a cable along a pipe, the clamp body including a cable holder; and a stop collar configured to fix a position of the clamp body adjacent to a radially protruding element around the pipe and to prevent the clamp body from rotating around the pipe.

18 Claims, 16 Drawing Sheets

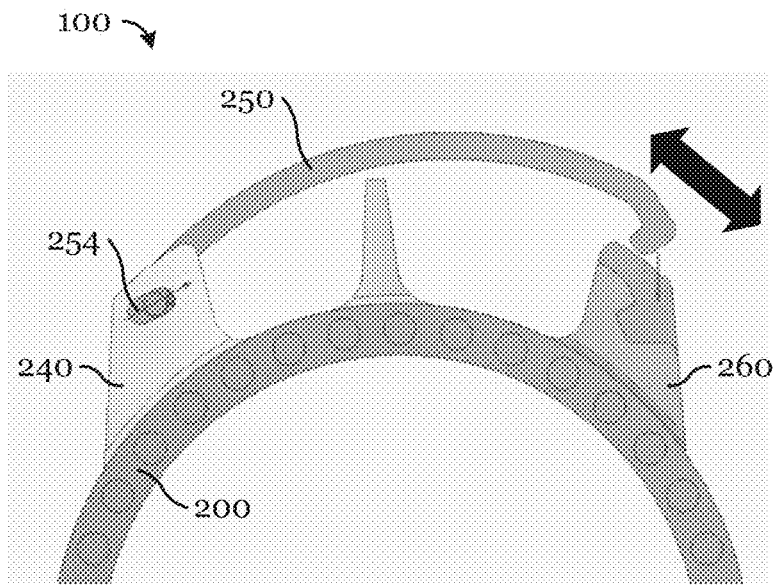
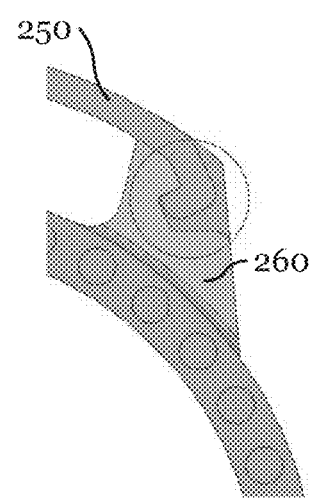
FIGURE 3A  FIGURE 3B
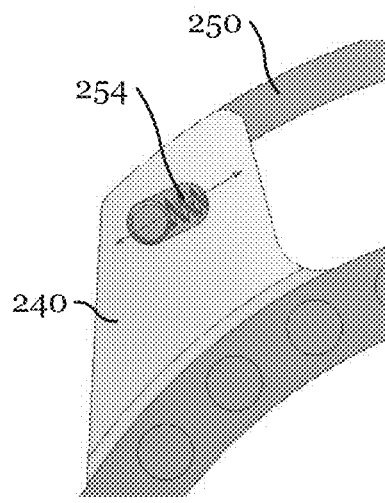
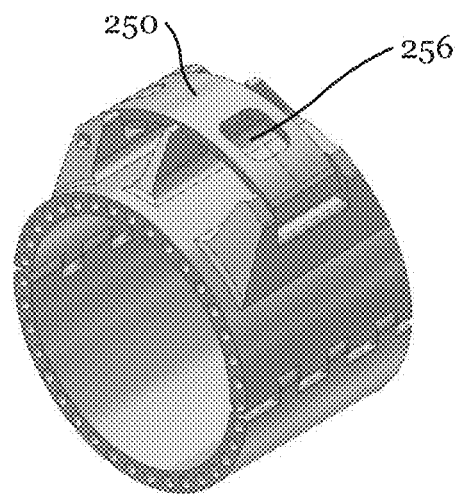
FIGURE 3C  FIGURE 3D

CABLE PROTECTOR CLAMP ASSEMBLY

TECHNICAL FIELD

The present invention relates generally to a system and method of protecting cables, and, in particular embodiments, to a system and method of a cable protector clamp assembly.

BACKGROUND

Generally, a recovery system to extract resources from oil, gas, or water wells includes both downhole and surface components. The main downhole components typically include an electrical submersible pump (ESP), a well pipe, and control lines such as electrical cables, fluid pressure lines, and fiber optic lines, among others. Control lines, if not properly protected, may easily be damaged inside the well during installation or operation.

Accordingly, a cable protector is often employed as an attachment to the well pipe to protect various cables used in the recovery system. A commonly used cable protector comprises two clamps to be fastened around a coupling that connects two pipes. The cable protector can then enclose one or more cables for protection and also ensure the alignment of cables with the well pipe. For continued development of recovery systems, further improvements of cable protector design are desired for better cable protection and stability without increasing manufacturing cost or installation time.

SUMMARY

In accordance with an exemplary embodiment of the present invention, a cable protector clamp assembly that includes a clamp body configured to hold and align a cable along a pipe, the clamp body including a cable holder; and a stop collar configured to fix a position of the clamp body adjacent to a radially protruding element around the pipe and to prevent the clamp body from rotating around the pipe.

In accordance with an exemplary embodiment of the present invention, a pipe joint assembly that includes a first pipe having a first outer diameter; a second pipe having a second outer diameter; a coupling to couple the first pipe and the second pipe, the coupling having an inner diameter equal to or greater than the first outer diameter; a cable disposed along the first pipe and the second pipe; a clamp body including a cable holder configured to hold and align the cable along the pipe joint; and a stop collar configured to fix a position of the clamp body adjacent to the coupling around the first pipe and to prevent the clamp body from rotating around the first pipe.

In accordance with an exemplary embodiment of the present invention, a method of installing a clamp assembly that includes installing a first clamp around a pipe near a coupling and closing the first clamp; locking the first clamp; sliding the first clamp toward a radially protruding element to contact the radially protruding element; installing a second clamp around the pipe near the first clamp and closing the second clamp; locking the second clamp; and sliding the second clamp toward the first clamp to contact the first clamp; and tightening a plurality of set screws positioned on the second clamp to fix positions of the first clamp and the second clamp.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A-2C illustrate a clamp body in accordance with an embodiment, wherein FIG. 2A illustrates a perspective view of the clamp body from an upward side, FIG. 2B illustrates a perspective close-up view from a downward side focusing on a cable holder of the clamp body, and FIG. 2C illustrates a bottom view from the downward side;

FIGS. 3A-3D illustrate a clamp body having an alternate design of a locking lid in accordance with another embodiment, wherein FIG. 3A illustrates a side view with the locking lid open, FIG. 3B illustrates a side view with the locking lid closed, FIG. 3C illustrates a side close-up view, and FIG. 3D illustrates a perspective view from a downward side;

FIGS. 4A and 4B illustrate a stop collar in accordance with an embodiment, wherein FIG. 4A illustrates a perspective view of the stop collar from an upward side and FIG. 4B illustrates a perspective close-up view focusing on an anti-rotation spring pin.

FIG. 5A-5C illustrate a cable protector clamp assembly in accordance with various embodiments of this disclosure, wherein FIG. 5A illustrates a cable protector clamp assembly comprising two stop collars, FIG. 5B illustrates an alternate embodiment where single tube pieces are used for a clamp body and a stop collar, and FIG. 5C illustrates yet another embodiment where the embodiments of FIGS. 5A and 5B are combined;

FIGS. 6A-6F illustrates a cable protector clamp assembly at different stages of installation in accordance with an embodiment, wherein FIG. 6A illustrates during attaching a clamp body around a pipe and inserting a hinge bolt, FIGS. 6B and 6C illustrate during and after sliding the clamp body toward a coupling, respectively, FIG. 6D illustrates during attaching a stop collar around the pipe and inserting a collar hinge bolt, FIG. 6E illustrates during sliding the stop collar toward the clamp body, and FIG. 6F illustrates after tightening set screws to fix a position of the stop collar and the clamp body;

FIG. 9B illustrates an alternate embodiment, and FIG. 9C illustrates another embodiment.

DETAILED DESCRIPTION OF ILLUSTRATIVE EMBODIMENTS

This application relates to a system and a method of protecting cables, more particularly to a cable protector clamp assembly that may be installed to a well pipe of a recovery system. In general, a cable protector clamp is typically attached to a well pipe at a fixed position, surrounding a coupling of a pipe joint, and able to protect the cables from damage during installation and operation of the well pipe and the recovery system. However, a cable protector clamp may need to be installed on-site (e.g., offshore) immediately before inserting the well pipe into a well. This installation may be a time-consuming step and may cause a substantial operational cost. Therefore, it may be desirable to develop an improved design for cable protector clamp that may be installed quickly. Addressing this issue, embodiments of the present application disclose systems of a cable protector clamp assembly comprising two pieces (i.e., a clamp body and a stop collar) and installation methods thereof.

The systems and methods described in this disclosure may advantageously reduce the time needed on site for installing the cable protector clamp and thereby improve the recovery process efficiency (e.g., oil and gas). This is possible because the two-piece configuration of the cable protector clamp assembly allows pre-assembling, where the two pieces of the cable protector clamp assembly may be attached in advance. As a result, on site, immediately before inserting the well pipe into the well, it is only necessary to align the clamp body by rotation and enclose the cables in the clamp body by, for example, snapping a lid without screwing on. In addition, the embodiments also enable an easy rotational adjustment of the cable protector clamp without having to loosen set screws.

In the following, a general description of an example cable protector clamp in accordance with an embodiment is first presented referring to FIG. 1. Two main components of the cable protector clamp, a clamp body and a stop collar, are then described in detail referring to FIGS. 2A-4B. An alternate design of a locking lid of the clamp body is illustrated in FIG. 3. In FIGS. 5 and 6, different stages of a cable protector clamp during an example installation process are illustrated. In FIGS. 7 and 8A-8C, example process flow charts of installation are illustrated in accordance with various embodiments.

Figure 1:
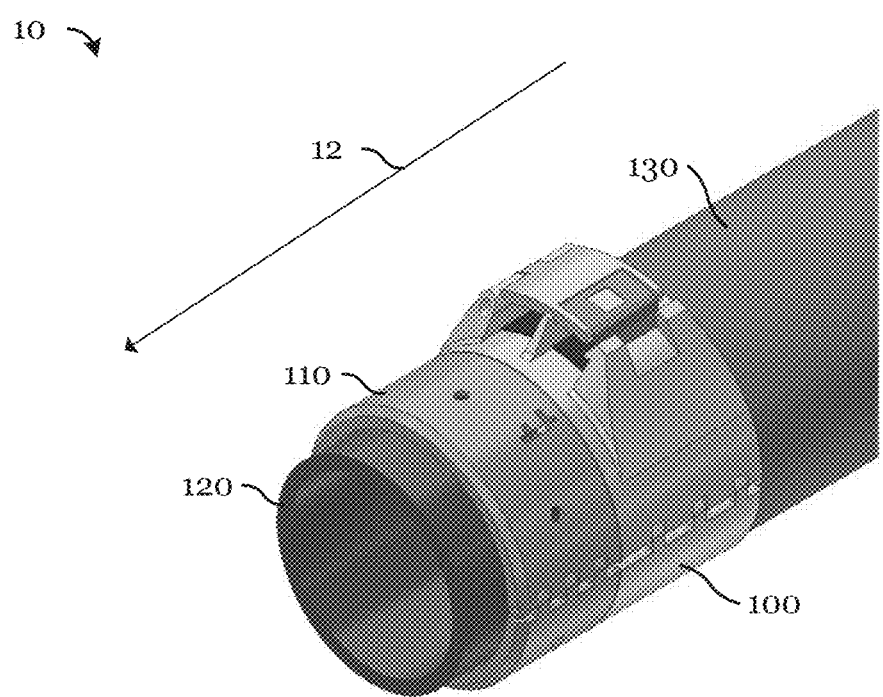
FIG. 1 illustrates a cable protector clamp assembly installed to a pipe joint in accordance with an embodiment of this disclosure.

FIG. 1 illustrates a pipe joint comprising a cable protector clamp assembly 10 in accordance with an embodiment of this disclosure.

In FIG. 1, the cable protector clamp assembly 10 comprises a clamp body 100 and a stop collar 110. As illustrated, the cable protector clamp assembly to is configured to be installed at a pipe joint comprising a pipe 120 and a coupling 130. An arrow 12 illustrates a direction of a main axis of the pipe 120, pointing in a downward direction when the pipe joint is inserted into a well. In various embodiments, the pipe 120 may be 25 ft to 45 ft long. In certain embodiments, the pipe 120 may be 30 ft to 40 ft long. In various embodiments, the pipe 120 may have an outer diameter between 3 in and 7 in. In certain embodiments, the pipe 120 may have an outer diameter between 4 in and 5 in. The pipe 120 may comprise steel or aluminum alloy, but other materials may also be used. A well pipe longer than a single pipe for various applications may be assembled by forming multiple pipe joints from many pipes. The coupling 130 may be used to form a pipe joint by coupling two pipes (e.g., the pipe 120 and another pipe). The coupling 130 may have an inner diameter equal to or larger than the outer diameter of the pipe 120.

As illustrated in FIG. 1, the cable protector clamp assembly 10 may be installed surrounding the pipe 120, with the clamp body 100 being positioned in contact with the coupling 130 at a downward side of the coupling 130 indicated by the arrow 12. In this disclosure, the "downward side" refers to a side of a pipe, a coupling, or else that will be facing downward when it is installed into the well. On the other hand, an "upward side" refers to a side that will be facing upward when it is installed into the well. The stop collar 110 may be installed surrounding the pipe 120 and being positioned in contact with the clamp body 100 at a downward side of the clamp body 100. The function of the stop collar 110 is to fix a position of the clamp body 100 in direction of the main axis of the pipe 120 as well as rotationally around the pipe 120. In various embodiments, the clamp body 100 may be 3 in to 8 in long and the stop collar 110 may be 2 in to 6 in long. The size of the clamp body 100 and the stop collar 110 may be selected based on the size of the pipe joint. In certain embodiments, the clamp body 100 or the stop collar 110 may comprise low-carbon steel, but may comprise other types of steel including stainless steel, plastics, composite materials, or other materials. In some embodiments, materials for the clamp body 100 or the stop collar 110 may be selected based on the materials for the pipe 120 or the coupling 130.

Figure 2A:
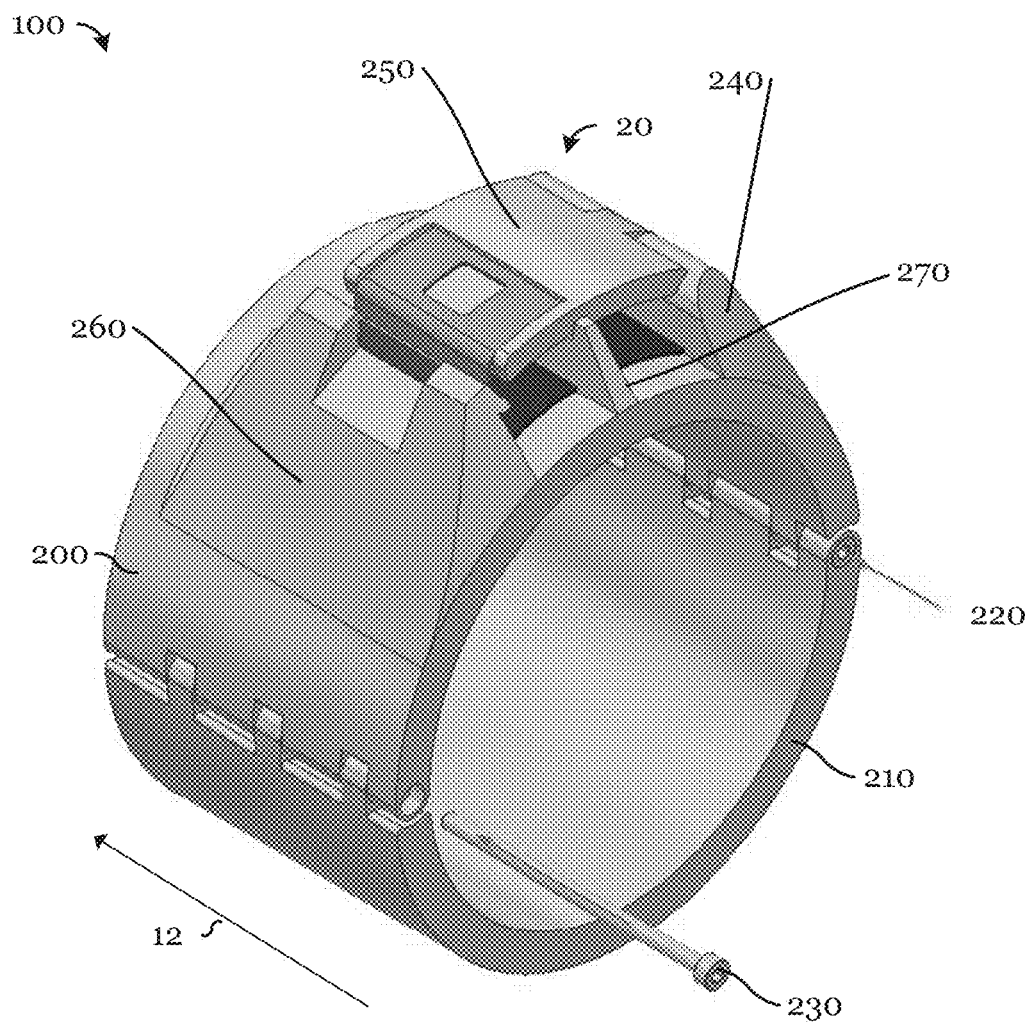

FIG. 2A illustrates a perspective view of a clamp body 100 from an upward side in accordance with an embodiment.

In FIG. 2A, the clamp body 100 comprises two clamp sections. In various embodiments, each of these clamp sections may have a semicircular shape. A first clamp section 200 and a second clamp section 210 may be pivotally jointed to each other by a first hinge bolt 220 installed, with the first hinge bolt 220 being a pivot point to allow opening and closing of the clamp body 100. In an alternate embodiment, the first clamp section 200 and the second clamp section 210 are separate and configured to be hinged using the first hinge bolt 220. When installing the clamp body 100, a second hinge bolt 230 may be inserted from the upward side to the other end of the two clamp sections for closure of the clamp body 100. As illustrated, the second hinge bolt 230 may have a thick head section so that it does not fall through the clamp body 100. In addition, inserting the second hinge bolt 230 from the upward side may prevent displacement of the second hinge bolt 230 because the upward side of the clamp body 100 will be pushed against and in contact with a coupling (e.g., the coupling 130 in FIG. 1).

The first clamp section 200 may further comprise a cable holder 20 section positioned on the outer side of the first clamp section 200. The cable holder 20 is configured to enclose and protect one or more cables, for example, used in downhole equipment such as an electric submersible pump (ESP). The cable holder 20 comprises a first base 240 that mounts a locking lid 250 and a second base 260 that receives and locks the locking lid 250. In various embodiments, a divider 270 may be present on the outer side of the first clamp section 200, positioned between the first base 240 and the second base 260. The divider 270 provides a mechanical support to the locking lid 250, preventing any bending or damage. This embodiment design with the divider 270 allows the cable holder 20 to provide better cable protection, as well as a supplemental guide for cable alignment within the cable holder 20. Further, this embodiment may advantageously be versatile to accommodate cables with any size smaller than the dimension of the open slot of the cable holder 20.

Figure 2B:
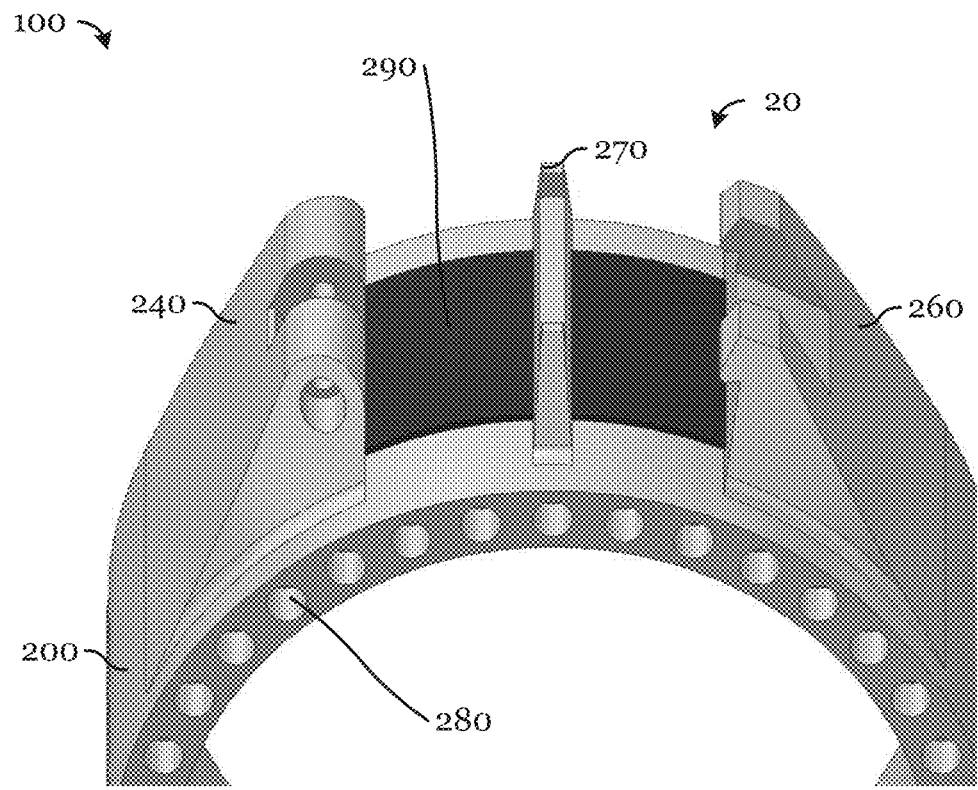

FIG. 2B illustrates a perspective close-up view of the clamp body 100 from a downward side focusing on a cable holder 20 in accordance with certain embodiments.

In FIG. 2B, the locking lid 250 in FIG. 2A is not shown to illustrate inside the cable holder 20. In some embodiments, at the bottom of the cable holder 20, the outer side of the first clamp section 200 may comprise a rubber element 290. This optional rubber element 290 may be swollen when immersed in brine, for example, during offshore installation and may provide grip to the cables.

On the downward side surfaces of the two clamp sections (e.g., the first clamp section 200 and the second clamp section 210), perpendicular to the main axis of the pipe 120, one or more clamp body anti-rotation elements are present. In the figures, the clamp body anti-rotation elements are formed by a plurality of pin holes 280. The pin holes 280 are configured to receive an anti-rotation spring pin attached to a stop collar so that a rotational position of the clamp body 100 may be locked, which will be described later in detail referring to a stop collar and installation methods. In various embodiments, the pin holes 280 are distributed in circle on the downward side surfaces with same intervals. In certain embodiments, 36 pin holes may be formed (i.e., one pin hole per 10°). In other embodiments, a total number of the pin holes 280 may be less or more than 36. A large number of pin holes may advantageously enable fine adjustment of the rotational position of the clamp body 100, while a small number of pin holes may be easier to manufacture. In one or more embodiments, one or more clamp body anti-rotation elements may comprise pin holes 280, threaded holes or grooves.

Next, two exemplary designs of the locking lid 250 are described below in FIGS. 2C and 3 in accordance with certain embodiments.

Figure 2C:
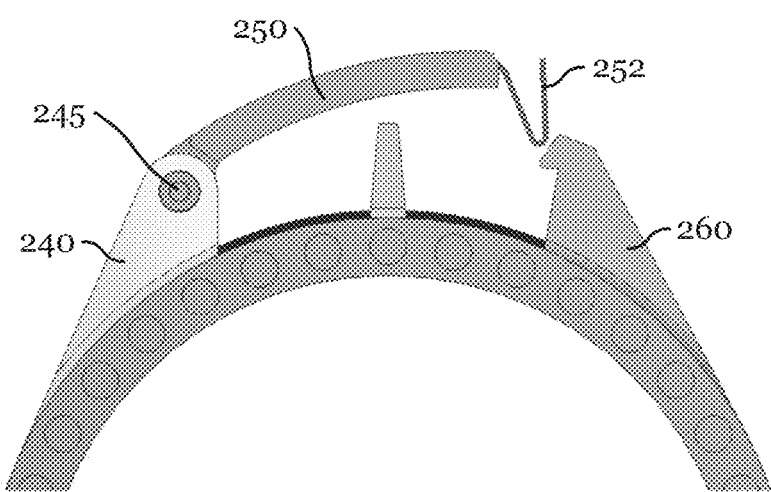

FIG. 2C illustrates a bottom view of the locking lid 250 from the downward side in accordance with an embodiment.

In FIG. 2C, the locking lid 250 comprises a U-shaped cantilever 252 at a moving end. The U-shaped cantilever 252 may comprise the same material used for the locking lid 250 or a different material, and may be welded to the locking lid 250. The U-shaped cantilever 252 may be configured to snap fit to the second base 260 when closing the locking lid 250. The second base 260 may comprise a hook to receive the U-shaped cantilever 252. To release the locking lid 250, the far end of the U-shaped cantilever 252 may be pushed toward the locking lid 250. In various embodiments, the non-moving end of the locking lid 250 may be fixed by a lid hinge bolt 245 as illustrated.

FIGS. 3A-3D illustrate a clamp body having an alternate design of a locking lid in accordance with another embodiment, wherein FIG. 3A illustrates a side view with the locking lid open, FIG. 3B illustrates a side view with the locking lid closed, FIG. 3C illustrates a side close-up view, and FIG. 3D illustrates a perspective view from a downward side.

In FIG. 3A, the first base 240 comprises a lid spring 254 in the first base 240 that allows the locking lid 250 to slide (also shown in a close-up view in FIG. 3C). The moving end of the locking lid 250 comprises a hook configured to fit to the second base 260. The lid spring 254 ensures a fit of the locking lid 250 to the second base 260. In FIG. 3A, the locking lid 250 open, and in FIG. 3B the locking lid 250 is closed. To release the locking lid 250, the locking lid 250 may be pushed and slid along the circumference of the clamp body 100 toward the second base 260 to extend the lid spring 254 (FIGS. 3A and 3C). Unlike the prior embodiment illustrated in FIG. 2C, the locking lid 250 does not have a U-shaped cantilever. This embodiment may be advantageous in providing a sufficient mechanical strength particularly at the moving end of the locking lid 250, since a cantilever design may be a weak area that may easily be deformed and/or possibly causing disengagement of the locking lid 250 with external force applied. Further, another benefit of the embodiment may include that the locking lid 250 may be manufactured from a single piece of material (e.g., a press steel) without welding, since a welded area may be a potential point of failure.

In FIG. 3D, the locking lid 250 comprises a finger hole 256 for locking/unlocking the locking lid 250. In certain embodiments, the finger hole 256 may be optional.

Figure 3E:
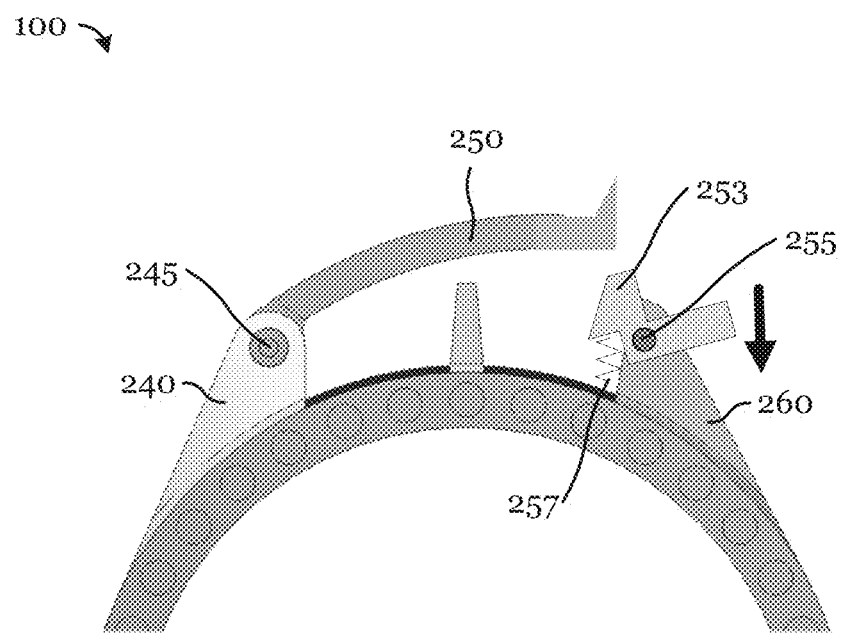
FIG. 3E illustrates a clamp body having another design of a locking lid in accordance with yet another embodiment.

FIG. 3E illustrates a clamp body having another design of a locking lid in accordance with yet another embodiment.

In FIG. 3E, the locking lid 250 having a hook at a moving end may be fixed by a lever 253. The lever 253 may be pivotally mounted on the second base 260 by a pin 255. The lever 253 is configured to receive the hook of the locking lid 250 at the inner side and fix the position of the locking lid 250 with a force provided by a lever spring 257. In one embodiment, the lever spring 257 may be positioned at the inner side of the lever 253, while in another embodiment it may be positioned at the outer side of the lever 253. The locking lid 250 may be released by pressing the outer side of the lever 253 (i.e., the far end from the locking lid 250) to lift the inner side of the lever 253.

Besides the exemplary embodiments above, any reasonable design of the locking lid 250 configured to secure locking may be used. In one embodiment, the locking lid 250 may comprise a hook similar to FIG. 3A but with a different shape, for example, curving upward similar to FIG. 2B.

Figure 4A:
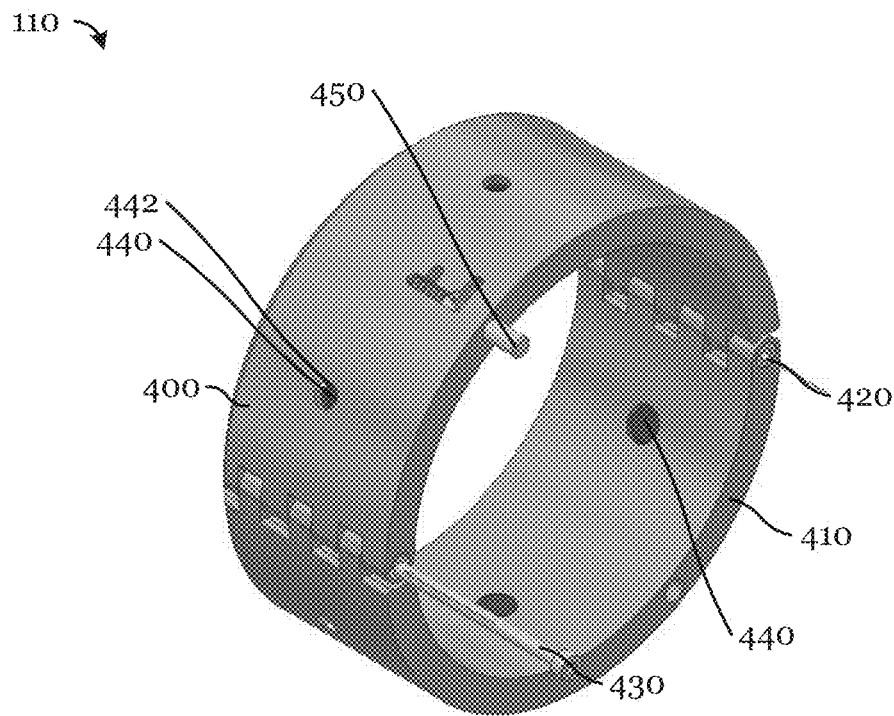

FIG. 4A illustrates a perspective view of a stop collar 110 from an upward side.

In FIG. 4A, the stop collar 110 may be another clamp similar to the clamp body 100, yet for a different purpose of fixing the position of the clamp body 100. As illustrated, the stop collar 110 may comprise two collar sections. In various embodiments, each of these collar sections may have a semicircular shape. A first collar section 400 and a second collar section 410 may be pivotally jointed to each other by a first collar hinge bolt 420 installed, with the first collar hinge bolt 420 being a pivot point to allow opening and closing of the stop collar 110. In an alternate embodiment, the first collar section 400 and the second collar section 410 are separate and configured to be hinged using the first collar hinge bolt 420. When installing the stop collar 110, a second collar hinge bolt 430 may be inserted from the upward side to the other end of the two collar sections for closure of the stop collar 110. As illustrated, the second collar hinge bolt 430 may have a thick head section so that it does not fall through the stop collar 110. In addition, inserting the second collar hinge bolt 430 from the upward side may prevent displacement of the second collar hinge bolt 430 because the upward side of the stop collar no will be pushed against and in contact with a clamp body (e.g., the clamp body 100 in FIG. 1).

Each of the first collar section 400 and the second collar section 410 may comprise a pair of set screw 440 and set screw hole 442. In various embodiments, each section may comprise three pairs of set screw 440 and set screw hole 442. FIG. 4A illustrates this embodiment with three pairs on each section, where only two pairs in the first collar section 400 and two pairs in the second collar section 410 (four out of six) are visible in the perspective view. The pairs may be distributed with same intervals on each section. The number of pairs of set screws and set screw holes for the stop collar 110 may be different between the first collar section 400 and the second collar section 410, depending on the size of each section. The total number of pairs of set screw and set screw hole for a stop collar 110 may be 1 or greater and may be selected based on the size of the stop collar no and desired stability of the cable protector clamp assembly. In one embodiment, each of the first collar section 400 and the second collar section 410 may comprise two pairs of set screw 440 and set screw hole 442 (so each pair contains one set screw 440 and one set screw hole 442), providing a total of four pairs for the stop collar 110. Yet in another embodiment, two pairs of set screw 440 and set screw hole 442 may be provided per location for a very high grip strength. For example, each of the first collar section 400 and the second collar section 410 may comprise three equally distributed locations for grip by screws, and at each location, two pairs of set screw 440 and set screw hole 442 may be positioned side by side, providing a total of twelve pairs for the stop collar 110. A better grip of the pipe by the stop collar 110 may be provided using many set screws, yet at the expense of increasing installation time. In various embodiments, the opening of set screw hole 442 may be configured so that the set screw 440 may be inserted only from inside the stop collar 110 before its installation around the pipe to prevent it from falling off from outside the stop collar 110. In other embodiments, the set screw 440 may be inserted from outside the stop collar 110 and other means to prevent it from falling off from outside the stop collar 110 may be employed, such as a bead of weld on the set screw hole 442 after the insertion of the set screw 440. Further, the opening of set screw hole 442 may be configured to allow tightening/loosening the set screw 440 from outside the stop collar 110 by, for example, a hex key. The first collar section 400 may comprise a clamp body locking element, such as a first anti-rotation spring pin 450 on the upward side, which is further described in FIG. 4B. In other embodiments, the clamp body locking element may include pins, clamps, lids, bolts and other elements configured to engage with the clamp body anti-rotation elements.

Figure 4B:
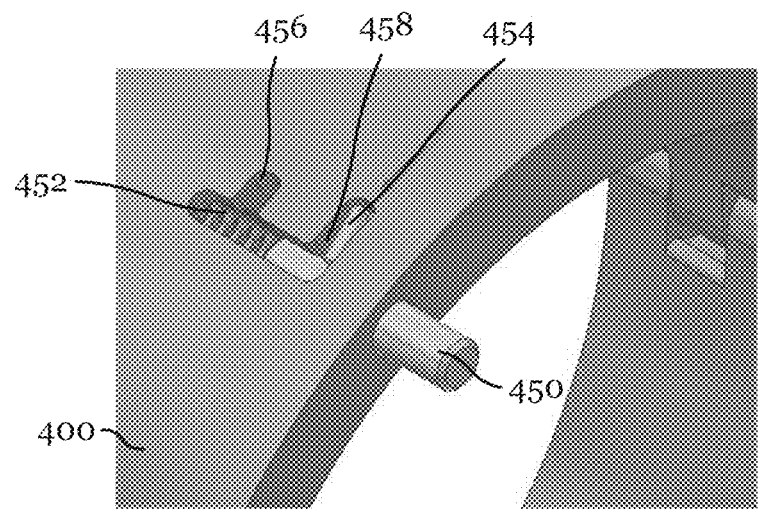

FIG. 4B illustrates a perspective close-up view focusing on an anti-rotation spring pin.

In FIG. 4B, the first anti-rotation spring pin 450 is embedded in the first collar section 400 at the upward side parallel to the main axis of the pipe and supported by a collar spring 452. As illustrated, the first anti-rotation spring pin 450 may have a side holding pin 454 configured to be hooked into one of two recesses on the outer surface of the first collar section 400. A first recess 456 is for a free position of the first anti-rotation spring pin 450 that allows the clamp body to rotate around the pipe. A second recess 458 is for an interlocked position of the first anti-rotation spring pin 450 that prevents the clamp body from rotating around the pipe. When the first anti-rotation spring pin 450 is in the interlocked position, the top portion of the first anti-rotation spring pin 450 is inserted to one of the pin holes of the clamp body (e.g., the pin holes 280 in FIG. 2B).

In various embodiments, a second anti-rotation spring pin may also be used. In certain embodiments, the second anti-rotation spring pin may be positioned on the second collar section 410, and in one embodiment, at the farthest position from the first anti-rotation spring pin 450. In general, the number of anti-rotation spring pins is not limited. More than one anti-rotation pins may be used for each section to provide a greater strength of interlocking of the clamp body 100.

In the exemplary embodiment illustrated in FIG. 1, the cable protector clamp assembly 10 comprises the clamp body 100 comprising two semicircular sections being positioned in contact with the coupling 130 at a downward side of the coupling 130. With this design of two hinged semicircular sections, it may advantageously be possible to install the cable protector clamp assembly 10 without access to the end of the pipe 120. In other embodiments, a cable protector clamp may have different configurations.

Figure 5A:
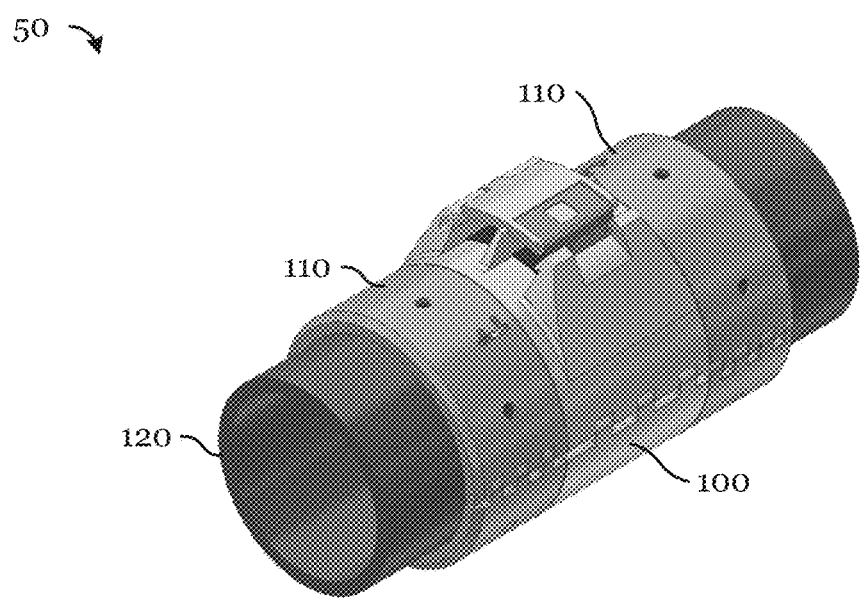
Figure 5B:
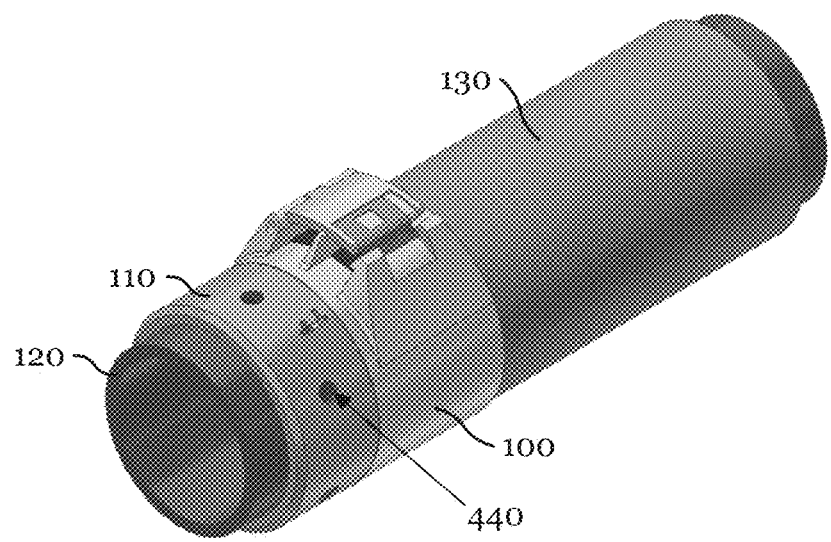
Figure 5C:
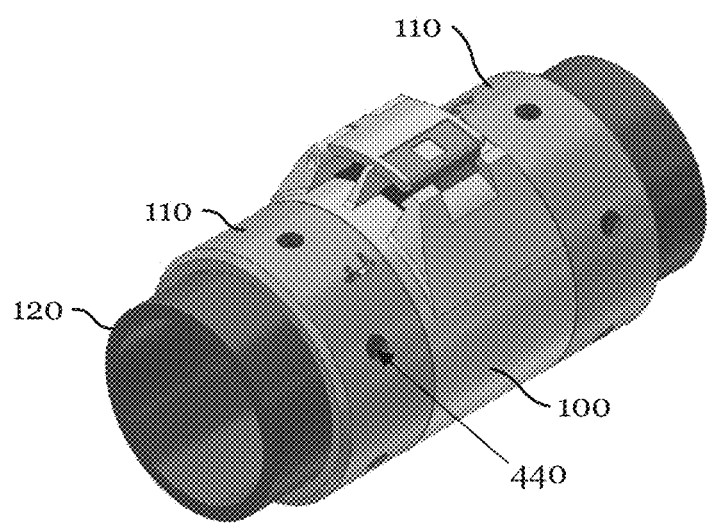

FIG. 5A-5C illustrate a cable protector clamp assembly in accordance with various embodiments of this disclosure.

FIG. 5A illustrates a cable protector clamp assembly 50 comprising two stop collars 110. In FIG. 5A, instead of a coupling 130 and a stop collar 110, two stop collars 110 may be used to fix the position of the clamp body 100. This embodiment may be beneficial particularly when a cable protector clamp is to be installed in the middle of a pipe instead of a pipe joint.

FIG. 5B illustrates a cable protector clamp assembly 52 where single tube pieces are used for a clamp body 100 and a stop collar 110. Instead of using two semicircular or similarly-shaped pieces, both the clamp body 100 and the stop collar 110 comprise circular tube pieces. In this embodiment, hinges may not be necessary since clamp body 100 and stop collar 110 can be inserted as slip on collars.

FIG. 5C illustrates a cable protector clamp assembly 54 where the two prior embodiments above are combined. A clamp body 100 may comprise a single tube piece instead of two pieces, and two stop collars 110, each comprising a single tube piece, may be used to fix the position of the clamp body 100.

Example installation methods for a cable protector clamp assembly are described below referring to FIGS. 6A-6F, 7, 8, and 9A-9C. Steps for installing the cable protector clamp may be grouped into two processes: an attachment process and a cable enclosure process. With conventional installation methods for conventional clamps, it may be necessary to perform all the steps for installation on-site (e.g., offshore). With the embodiment methods of this disclosure, on the other hand, it is possible to perform the attachment process and the cable enclosure process at different locations at different timings. For example, the attachment process may be performed in advance before shipping equipment offshore, together with assembling a well pipe and pipe joints, and then the cable enclosure process may be performed offshore immediately before installing equipment into a well. This operation may save time and cost because installation and operation offshore may be more cumbersome and costly than onshore.

In the following, the attachment process is first described referring to FIGS. 6A-6F and FIG. 8 together, and the cable enclosure process is described next referring to FIGS. 7 and 9A-9C together.

FIGS. 6A-6F illustrates a cable protector clamp assembly at different stages of the attachment process during installation in accordance with an embodiment.

Figure 8:
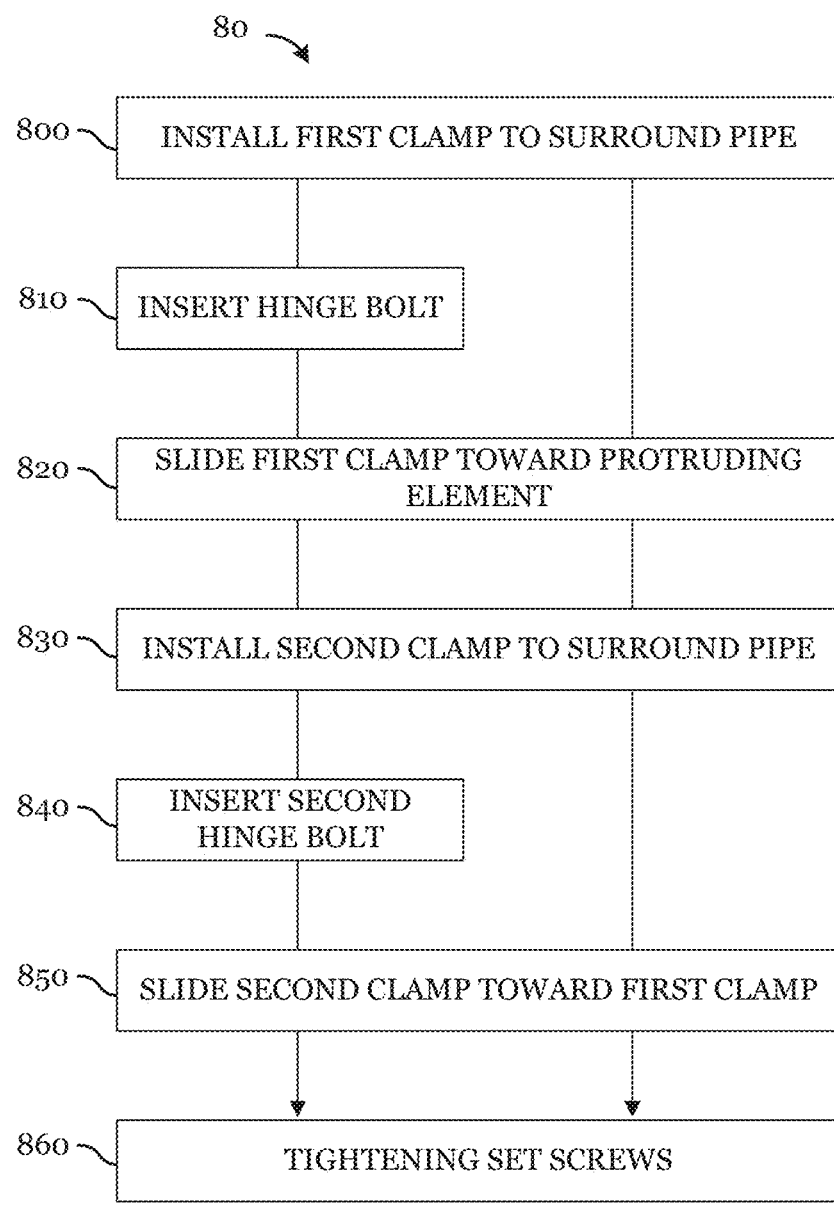
FIG. 8 illustrates an example process flow of installing a cable protector clamp assembly in accordance with an embodiment.

FIG. 8 illustrates an example process flow 80 of the attachment process.

Figure 6A:
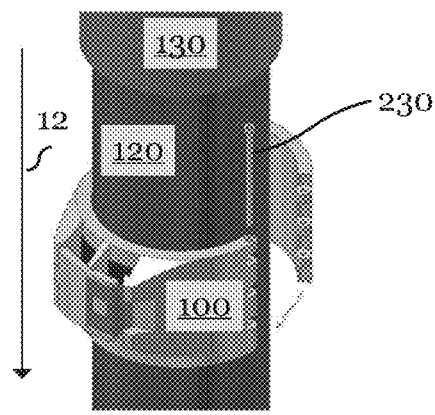
Figure 6B:
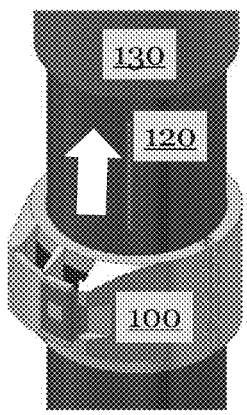

First, the clamp body 100, when in an open configuration, is placed to surround the pipe 120, at a downward side of the coupling 130 (FIG. 6A and block 800 in FIG. 8). The clamp body 100 is then closed surrounding the pipe 120 and the second hinge bolt 230 is inserted from the upward side to the clamp body 100 to lock the clamp body 100 (block 810 in FIG. 8). In an alternate embodiment where the clamp body 100 does not comprise a hinge (e.g., FIGS. 5B and 5C), block 810 may be skipped.

Figure 6C:
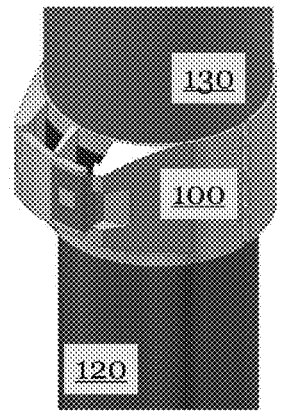

The clamp body 100 is then slid toward a radially protruding element (FIG. 6B and block 820 in FIG. 8) until the upward side of the clamp body 100 is in contact with the downward side of the radially protruding element (FIG. 6C). The radially protruding element may be a coupling 130 (FIGS. 6A-6F) or another stop collar 110 (e.g., FIG. 5A). In accordance with FIGS. 6A-6F, the radially protruding element is referred to as the coupling 130 in the following, unless otherwise described. At this stage, it is important to ensure the contact of the clamp body 100 with the coupling 130 since the shoulder of the coupling 130 (formed by the different diameters of the pipe 120 and the coupling 130) is a fixed position that helps preventing the clamp body 100 from sliding further upward.

Figure 6D:
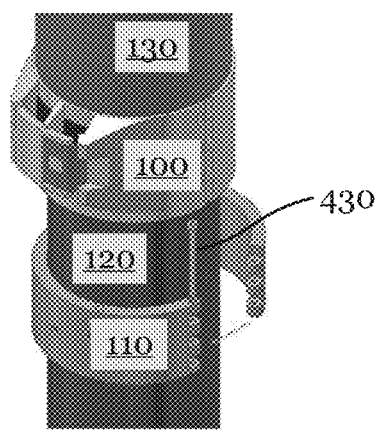
Figure 6E:
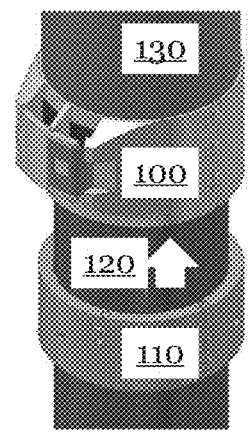

Next, the stop collar 110, when in an open configuration, is placed to surround the pipe 120, at a downward side of the clamp body 100 (FIG. 6D and block 830 in FIG. 8). The stop collar 110 is then closed surrounding the pipe 120 and the second collar hinge bolt 430 is inserted from the upward side to the stop collar 110 to lock the stop collar 110 (block 840 in FIG. 8). In an alternate embodiment where the stop collar 110 does not comprise a hinge (e.g., FIGS. 5B and 5C), block 840 may be skipped.

Figure 6F:
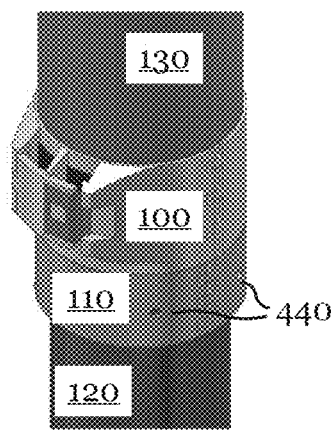

The stop collar 110 is then slid toward the clamp body 100 (FIG. 6E and block 850 in FIG. 8) until the upward side of the stop collar 110 is in contact with the downward side of the clamp body 100 (FIG. 6F). Once the clamp body 100 and the stop collar 110 are completely slid and pushed against the coupling 130, the set screws 440 (only one screw is visible in FIG. 6F) are tightened to fix and secure the position of the stop collar 110. This completes the attachment process of installation. At this stage, the clamp body 100 may still freely rotate around the pipe 120 but cannot move along the main axis of the pipe 120, fixed by the stop collar 110 and the coupling 130.

Figure 7:
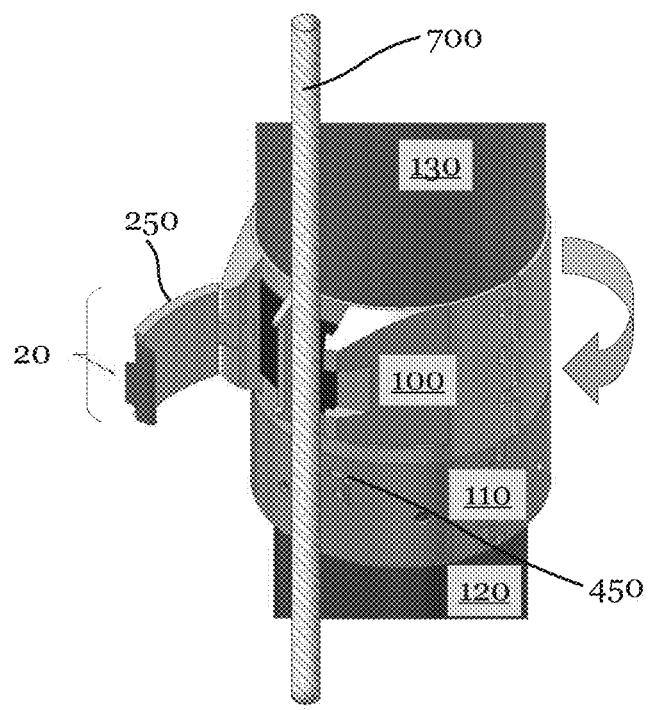
FIG. 7 illustrates a cable protector clamp assembly at a cable enclosure process in accordance with an embodiment.

FIG. 7 illustrates a cable protector clamp assembly at a cable enclosure process in accordance with an embodiment.

Figure 9A:
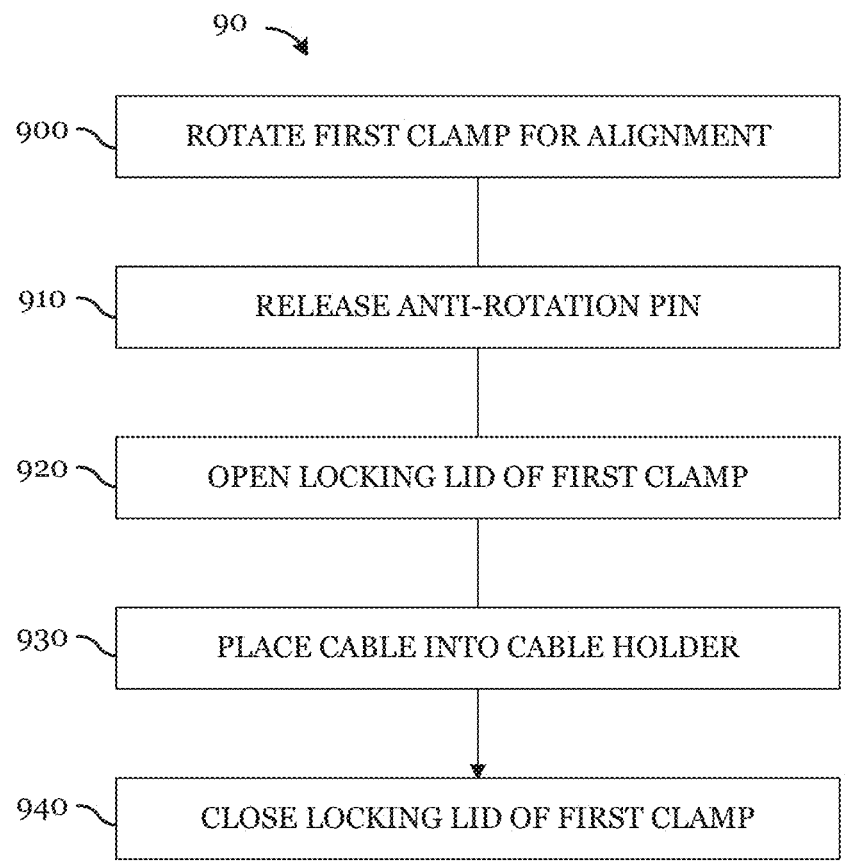
FIGS. 9A-9C illustrate example process flows of a cable enclosure process in accordance with various embodiments, wherein FIG. 9A illustrate an example embodiment.

FIG. 9A illustrates an example process flow of a cable enclosure process 90 in accordance with embodiments.

After the attachment process, the cable holder 20 of the clamp body 100 may be facing to any direction due to the rotational freedom around the pipe 120. In cable protection, it is important to align cables on one side of the pipe 120 to minimize the risk of damage during installation and operation of equipment. Accordingly, at the cable enclosure process, the clamp body 100 is first rotated to align with the position of a cable 700 (FIG. 7 and block 900 in FIG. 9A-9C).

Next, in accordance with an embodiment as illustrated in FIG. 9A, the first anti-rotation spring pin 450 of the stop collar 110 is released to be locked into a nearest one of the pin holes 280 (although not visible in FIG. 7) at the downward side of the clamp body 100 (block 910). A fine rotational adjustment may be performed to precisely align the first anti-rotation spring pin 450 with the nearest pine hole. In one embodiment, the first anti-rotation spring pin 450 may hit a spacing between two pin holes 280 and the fine rotational adjustment may allow locking of the anti-rotation spring pin 450 into one of the two pin holes 280. This step of releasing the first anti-rotation spring pin 450 locks the rotational position of the clamp body 100 and the clamp body 100 can no longer rotate around the pipe 120.

The locking lid 250 is then opened (block 920), the cable 700 is placed inside the cable holder 20 (block 930), and the locking lid 250 is closured to secure the enclosure of the cables (block 940). Some conventional methods of installing a conventional cable protector clamp may require tightening screws for the clamp, which may be time consuming. In contrast, as described above, this embodiment method may only require snapping in an anti-rotation spring pin and a locking lid at a cable enclosure process and may not require any tightening of any screws. This may lead to a reduction of operation time and cost. This is enabled by the design of two-piece configuration of the cable protector clamp assembly according to various embodiments of this disclosure, allowing an attachment process to be performed in advance off-site (e.g., onshore). In one embodiment, an on-site installation (e.g., during a run-in-hole (RIH) process at a rotary) time of a conventional clamp that typically takes 60 seconds or longer, may be reduced to 10 sec or less using the embodiment cable protector clamp assembly. In one embodiment, the embodiment cable protector clamp assembly may be installed on an auxiliary floor before racking back pipe. Further, while the conventional clamp may require more than one worker for installation (e.g., one worker closing a clamp over the cables while another worker engaging and tightening the bolts), the on-site installation of the cable protector clamp assembly according to various embodiments may be performed by only one worker.

The cable 700 may comprise a plurality of cables or a bundle of various cables. For example, the cable 700 may comprise a submersible pump cable designed for an electric submersible pump (ESP). The cable 700 may also comprise fluid pressure lines, electrical lines, or fiber optic lines. The cable 700 may be a flat cable, a round cable, or a different type.

Figure 9B:
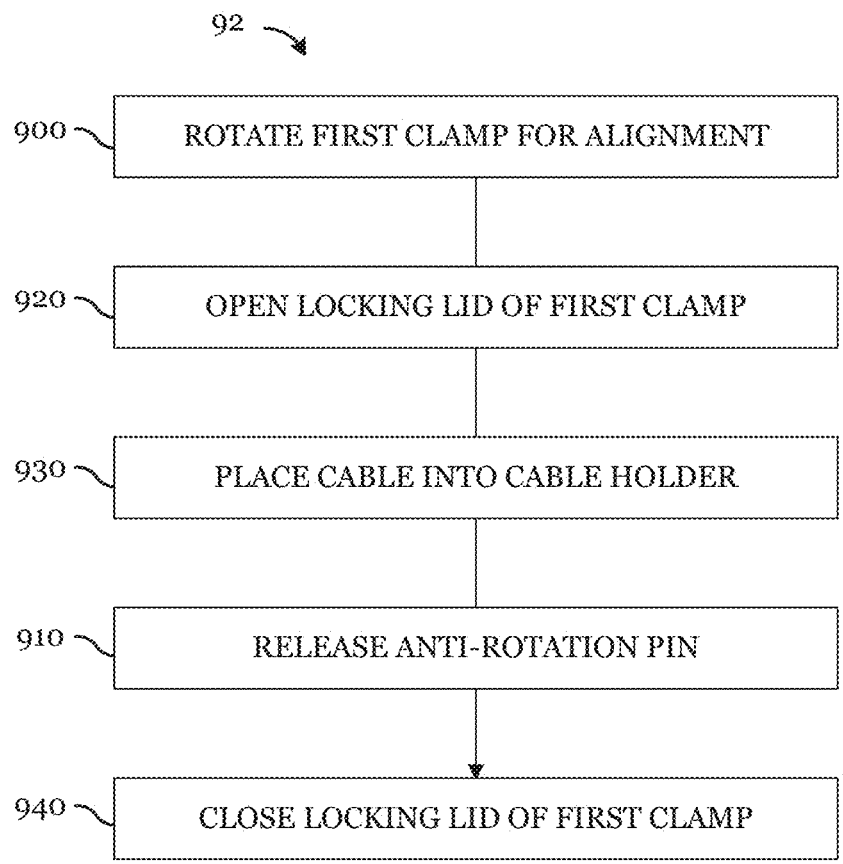
Figure 9C:
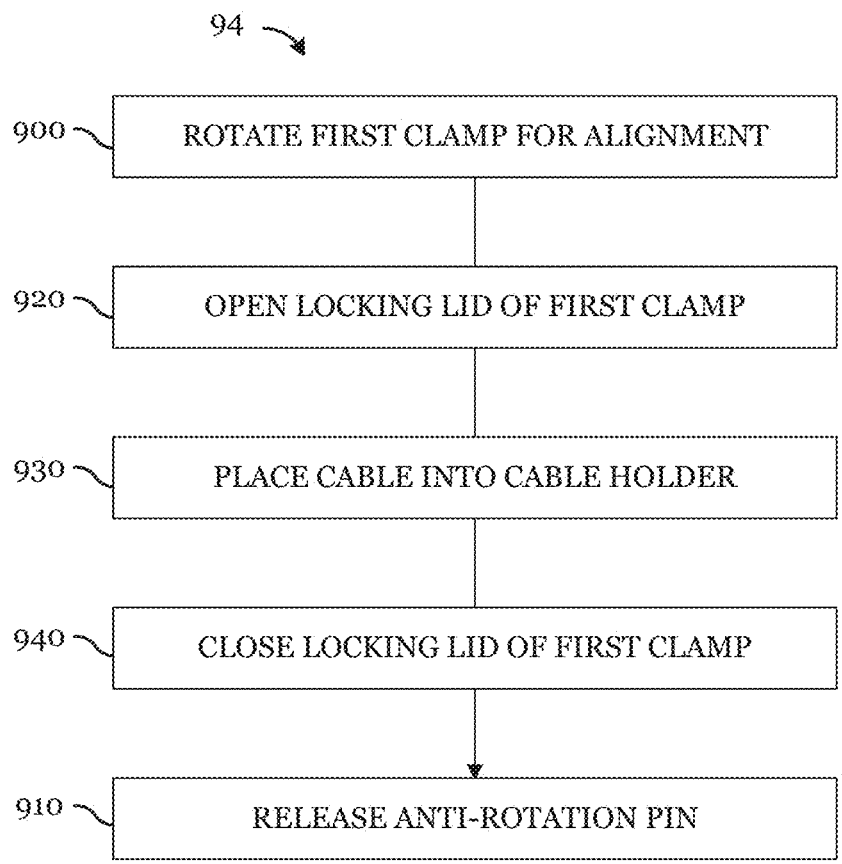

FIGS. 9B and 9C illustrate alternate embodiments of cable enclosure process flows.

In a cable enclosure process flow 92 in FIG. 9B, after rotating the clamp body 100 for alignment (block 900), opening of the locking lid 250 (block 920) and placing the cables inside the cable holder 20 (block 930) are performed prior to releasing the first anti-rotation spring pin 450 (block 910), followed by closing the locking lid 250 (block 940).

In a cable enclosure process flow 84 in FIG. 8C, after rotating the clamp body 100 for alignment (block 900), opening of the locking lid 250 (block 920), placing the cables inside the cable holder 20 (block 930), and closing the locking lid 250 (block 940) are performed prior to releasing the first anti-rotation spring pin 450 (block 910).

In various embodiments, more than one cable protector clamp assembly may be used for a well pipe comprising multiple pipe joints.

Installing multiple cable protector clamp assemblies may be performed by repeating the processes described above. In certain embodiments, each of the cable protector clamp assemblies may be attached through the attachment process off-site (e.g., onshore) and only the cable enclosure process for each of the cable protector clamp assemblies may be performed on-site (e.g., offshore). The cable enclosure process may be performed in the same fashion for each of the cable protector clamp assemblies according to one of the installation methods. Alternately, more than one installation methods may be used.

Figure 10:
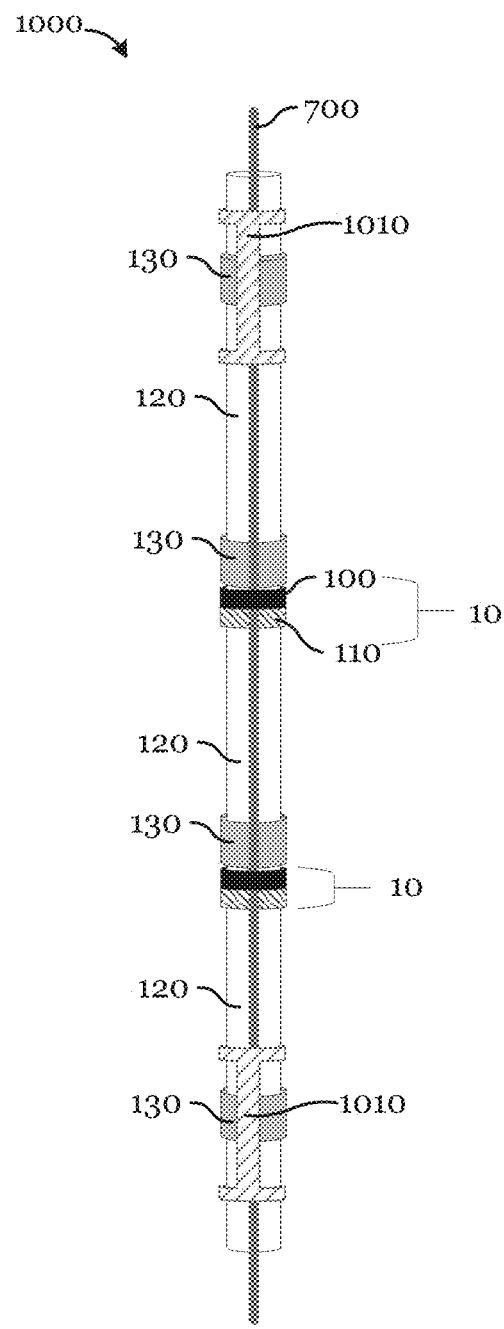
FIG. 10 illustrates an example pipe stack of a well pipe comprising multiple pipe joints in accordance with an embodiment.

FIG. 10 illustrates an example pipe stack 1000 of a well pipe comprising multiple pipe joints in accordance with an embodiment.

In various embodiments, a well pipe may comprise multiple pipe stacks, with each pipe stack comprising several pipes. In one embodiment, the well pipe may comprise 50 pipe stacks. The pipe stack may comprise both a cable protector clamp assembly 10 at a coupling of a pipe joint and a conventional clamp that may provide a line support to cables at another coupling of another pipe joint.

For example, in FIG. 10, the pipe stack 1000 comprises four pipes joints with four couplings 130, where five pipes 120 are illustrated with two among five only partly illustrated. Conventional clamps 1010 may be used at a first coupling and a fourth coupling, where a cable 700 is gripped by a conventional clamp 1010. At a second and a third coupling, the cable protector clamp assemblies 10 described in this disclosure may be used to provide an additional guide for the cable 700. In this embodiment, the time required to install all clamps (e.g., the conventional clamps 1010 and the cable protector clamp assemblies 10) on-site (e.g., offshore) may be still shorted than a conventional installation method using only the conventional clamps 1010 (e.g., the case where all of the four clamps in FIG. 10 are conventional clamps).

In various embodiment, the cable protector clamp assembly described in this disclosure may provide improved ratings higher than conventional clamps. In one embodiment, an axial strength may be 2.3 times higher and a rotational strength may be 1.3 times higher. In one embodiment, a lateral strength at a locking lid area may be comparable to a conventional clamp.

Example embodiments of the invention are summarized here. Other embodiments can also be understood from the entirety of the specification as well as the claims filed herein.

Example 1. A cable protector clamp assembly that includes a clamp body configured to hold and align a cable along a pipe, the clamp body including a cable holder; and a stop collar configured to fix a position of the clamp body adjacent to a radially protruding element around the pipe and to prevent the clamp body from rotating around the pipe.

Example 2. The cable protector clamp assembly of example 1, where the stop collar includes a set screw, a set screw hole, and a clamp body locking element, the set screws being configured to fix a position of the stop collar relative to the pipe, and where the clamp body includes a clamp body anti-rotation element configured to be coupled to the clamp body locking element to fix the rotational position of the clamp body relative to the stop collar. Advantageously coupling the clamp body locking element and the clamp body anti-rotation element may ensure the interlocking of the rotational position that is preferred for stable cable enclosure in the cable holder.

Example 3. The cable protector clamp assembly of one of examples 1 to 2, where the clamp body includes: a first clamp section including the cable holder which includes a locking lid; and a second clamp section that is pivotally mounted to the first clamp section and configured to surround the pipe, and where the stop collar includes: a first collar section including a first set screw and a first set screw hole; a second collar section that is pivotally mounted to the first collar section and configured to surround the pipe, where the second collar section includes a second set screw and a second set screw hole; and the set screws being configured to fix a position of the stop collar relative to the pipe. Advantageously adding the second set screw and the second set screw hole may further improve the strength of the interlocking of the rotational position of the clamp body.

Example 4. The cable protector clamp assembly of one of examples 1 to 3, where the clamp body anti-rotation element includes a plurality of pin holes positioned on surfaces of the first clamp section and the second clamp section perpendicular to a main axis of the first pipe, where the clamp body locking element includes a first anti-rotation spring pin being configured to be inserted into one of the plurality of pin holes of the clamp body and to prevent the cable protector clamp body from rotating around the first pipe, and where the first clamp section, the second clamp section, the first collar section, and the second collar section are semicircular in shape. Advantageously adding the plurality of pin holes may allow selecting a rotational position of the clamp body from any one of the positions where one of the plurality of pin holes is located.

Example 5. The cable protector clamp assembly of one of examples 1 to 4, where the second clamp section is pivotally mounted to the first clamp section by a first hinge bolt and configured to be locked by a second hinge bolt, and where the second collar section is pivotally mounted to the first collar section by a first collar hinge bolt and configured to be locked by a second collar hinge bolt. Advantageously using the hinge bolt may allow installing the cable protector clamp assembly at any location of the pipe.

Example 6. The cable protector clamp assembly of one of examples 1 to 5, where the cable holder includes: a first base, positioned on an outer surface of the first clamp section, to mount a first side of the locking lid; and a second base, positioned on the outer surface of the first section, to receive and lock a second side of the locking lid.

Example 7. The cable protector clamp assembly of one of examples 1 to 6, where the second side of the locking lid includes a U-shaped cantilever that enables a snap fit to the second base.

Example 8. The cable protector clamp assembly of one of examples 1 to 6, where the first base includes a spring to allow the locking lid to slide, and where the second side of the locking lid has a hook configured to fit to the second base.

Example 9. The cable protector clamp assembly of one of examples 1 to 8, where the cable holder further includes a divider positioned on the outer surface of the first section between the first base and the second base. Advantageously adding the divider may further provide a mechanical support to the cable holder and a guide for aligning multiple cables.

Example 10. The cable protector clamp assembly of one of examples 1 to 9, where the cable holder further includes a rubber element configured to be swollen when immersed in a solution. The rubber element added to the cable holder may be immersed in a brine, for example, at a time of installation, and be swollen, advantageously providing further grip to the cable.

Example 11. The cable protector clamp assembly of one of examples 1 to 10, where the first anti-rotation spring pin is embedded to the first collar section parallel to the main axis of the first pipe, where the first anti-rotation spring pin includes a side holding pin configured to be hooked into one of two recesses on an outer surface of the first collar section, and where a first recess is for a free position of the first anti-rotation spring pin that allows the clamp to rotate and a second recess is for an interlocked position of the first anti-rotation spring pin that prevents the clamp from rotating.

Example 12. A pipe joint assembly that includes a first pipe having a first outer diameter; a second pipe having a second outer diameter; a coupling to couple the first pipe and the second pipe, the coupling having an inner diameter equal to or greater than the first outer diameter; a cable disposed along the first pipe and the second pipe; a clamp body including a cable holder configured to hold and align the cable along the pipe joint; and a stop collar configured to fix a position of the clamp body adjacent to the coupling around the first pipe and to prevent the clamp body from rotating around the first pipe.

Example 13. The pipe joint assembly of example 12, the clamp body including: two semicircular sections connected by a first clamp hinge bolt, where a first semicircular clamp section, on an outer surface of the first semicircular clamp section, includes the cable holder, including a divider, and a locking lid; a plurality of pin holes on a first edge of the clamp body, where the first edge is configured to face downward when installing the pipe joint; and a second clamp hinge bolt configured to be inserted into the clamp body, and where inserting the second clamp hinge bolt locks the clamp body.

Example 14. The pipe joint assembly of one of examples 12 or 13, the stop collar including: a first semicircular collar section including a first anti-rotation spring pin; a second semicircular collar section that is pivotally mounted by a first collar hinge bolt to the first semicircular collar section and configured to surround the first pipe and to be locked by a second collar hinge bolt; a plurality of pairs of a set screw and a set screw hole configured to fix positions of the stop collar and the clamp body relative to the first pipe, where half of the plurality of pairs are on the first semicircular collar section and another half of the plurality of pairs are on the second semicircular collar section; and an anti-rotation spring pin positioned on an edge of the first semicircular collar section configured to be inserted into one of the plurality of pin holes of the clamp body and to prevent the clamp body from rotating around the first pipe. Distributing the plurality of pairs of the set screw and the set screw hole among the first semicircular collar section and the second semicircular collar section may advantageously improve the uniform distribution of the mechanical grip of the stop collar on the first pipe.

Example 15. The pipe joint assembly of one of examples 12 to 14, where the set screw hole is configured to allow inserting the set screw only from an inner side of the stop collar and to allow tightening and loosening the set screw from an outer side of the stop collar. Advantageously limiting the inserting to the inner side of the stop collar may prevent the set screw from falling.

Example 16. A method of installing a clamp assembly that includes installing a first clamp around a pipe near a coupling and closing the first clamp; locking the first clamp; sliding the first clamp toward a radially protruding element to contact the radially protruding element; installing a second clamp around the pipe near the first clamp and closing the second clamp; locking the second clamp; and sliding the second clamp toward the first clamp to contact the first clamp; and tightening a plurality of set screws positioned on the second clamp to fix positions of the first clamp and the second clamp.

Example 17. The method of example 16, further including a cable enclosure process, the cable enclosure process including: after installing the first clamp and the second clamp, rotating the first clamp to align a cable holder of the first clamp with a cable; fixing a rotational position of the first clamp by using a clamp body locking element; and enclosing the cable into the cable holder.

Example 18. The method of one of example 17, where fixing the rotational position of the first clamp is performed after enclosing the cable into the cable holder.

Example 19. The method of one of examples 16 to 18, where installing the clamp assembly is performed to form a pipe stack including a plurality of pipes and pipe joints, and where each of a first pipe joint and a last pipe joint includes a clamp having a design different from the clamp assembly.

Example 20. The method of one of examples 16 to 19, where the cable enclosure process is performed offshore immediately before installing the pipe and the clamp assembly into a well, and where preceding steps before the cable enclosure process are performed in advance at a different location.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A cable protector clamp assembly comprising:
a clamp body configured to hold and align a cable along a pipe, the clamp body comprising a cable holder; and
a stop collar configured to fix a position of the clamp body relative to a radially protruding element around the pipe at a downward side of the radially protruding element and to prevent the clamp body from rotating around the pipe,
wherein the stop collar comprises a set screw, a set screw hole, and a clamp body locking element, the set screw being configured to fix a position of the stop collar relative to the pipe, and
wherein the clamp body comprises a clamp body anti-rotation element configured to be coupled to the clamp body locking element to fix a rotational position of the clamp body relative to the stop collar,
wherein the clamp body comprises:
a first clamp section comprising the cable holder which includes a locking lid; and
a second clamp section that is pivotally mounted to the first clamp section and configured to surround the pipe, and
wherein the stop collar comprises:
a first collar section comprising a first set screw and a first set screw hole;
a second collar section that is pivotally mounted to the first collar section and configured to surround the pipe, wherein the second collar section comprises a second set screw and a second set screw hole; and
the set screws being configured to fix a position of the stop collar relative to the pipe.

2. The cable protector clamp assembly of claim 1,
wherein the clamp body anti-rotation element comprises a plurality of pin holes positioned on surfaces of the first clamp section and the second clamp section perpendicular to a main axis of the pipe,
wherein the clamp body locking element comprises a first anti-rotation spring pin being configured to be inserted into one of the plurality of pin holes of the clamp body and to prevent the clamp body from rotating around the pipe, and
wherein the first clamp section, the second clamp section, the first collar section, and the second collar section are semicircular in shape.

3. The cable protector clamp assembly of claim 2,
wherein the first anti-rotation spring pin is embedded to the first collar section parallel to the main axis of the pipe,
wherein the first anti-rotation spring pin comprises a side holding pin configured to be hooked into one of two recesses on an outer surface of the first collar section, and
wherein a first recess is for a free position of the first anti-rotation spring pin that allows the clamp to rotate and a second recess is for an interlocked position of the first anti-rotation spring pin that prevents the clamp from rotating.

4. The cable protector clamp assembly of claim 1,
wherein the second clamp section is pivotally mounted to the first clamp section by a first hinge bolt and configured to be locked by a second hinge bolt, and
wherein the second collar section is pivotally mounted to the first collar section by a first collar hinge bolt and configured to be locked by a second collar hinge bolt.

5. The cable protector clamp assembly of claim 1, wherein the cable holder comprises:
- a first base, positioned on an outer surface of the first clamp section, to mount a first side of the locking lid; and
- a second base, positioned on the outer surface of the first clamp section, to receive and lock a second side of the locking lid.

6. The cable protector clamp assembly of claim 5, wherein the second side of the locking lid comprises a U-shaped cantilever that enables a snap fit to the second base.

7. The cable protector clamp assembly of claim 5,
wherein the first base comprises a spring to allow the locking lid to slide, and
wherein the second side of the locking lid has a hook configured to fit to the second base.

8. The cable protector clamp assembly of claim 5, wherein the cable holder further comprises a divider positioned on the outer surface of a first section between the first base and the second base.

9. The cable protector clamp assembly of claim 5, wherein the cable holder further comprises a rubber element configured to be swollen when immersed in a solution.

10. The cable protector clamp assembly of claim 1, wherein the stop collar comprises set screw holes to accommodate corresponding set screws, the set screws being configured to extend radially and grip the stop collar relative to the pipe.

11. A pipe joint assembly comprising:
- a first pipe having a first outer diameter;
- a second pipe having a second outer diameter;
- a coupling to couple the first pipe and the second pipe, the coupling having an inner diameter equal to or greater than the first outer diameter;
- a cable disposed along the first pipe and the second pipe;
- a clamp body comprising a cable holder configured to hold and align the cable along a pipe joint between the first pipe and the second pipe; and
- a stop collar configured to fix a position of the clamp body relative to the coupling around the first pipe at a downward side of the coupling and to prevent the clamp body from rotating around the first pipe,
the clamp body comprising:
- two semicircular sections connected by a first clamp hinge bolt, wherein a first semicircular clamp section, on an outer surface of the first semicircular clamp section, comprises the cable holder, including a divider, and a locking lid;
- a plurality of pin holes on a first edge of the clamp body, wherein the first edge is configured to face downward when installing the pipe joint; and
- a second clamp hinge bolt configured to be inserted into the clamp body, and wherein inserting the second clamp hinge bolt locks the clamp body.

12. The pipe joint assembly of claim 11, the stop collar comprising:
- a first semicircular collar section comprising a first anti-rotation spring pin;
- a second semicircular collar section that is pivotally mounted by a first collar hinge bolt to the first semicircular collar section and configured to surround the first pipe and to be locked by a second collar hinge bolt;
- a plurality of pairs of a set screw and a set screw hole configured to fix positions of the stop collar and the clamp body relative to the first pipe, wherein half of the plurality of pairs are on the first semicircular collar section and another half of the plurality of pairs are on the second semicircular collar section; and
- an anti-rotation spring pin positioned on an edge of the first semicircular collar section configured to be inserted into one of plurality of pin holes of the clamp body and to prevent the clamp body from rotating around the first pipe.

13. The pipe joint assembly of claim 12, wherein the set screw hole is configured to allow inserting the set screw only from an inner side of the stop collar and to allow tightening and loosening the set screw from an outer side of the stop collar.

14. A method of installing a clamp assembly, the method comprising:
- installing a first clamp around a pipe near a coupling and closing the first clamp;
- locking the first clamp;
- sliding the first clamp toward a downward side of a radially protruding element to contact the radially protruding element;
- installing a second clamp around the pipe near the first clamp and closing the second clamp;
- locking the second clamp; and
- sliding the second clamp toward a downward side of the first clamp to contact the first clamp; and
- tightening a plurality of set screws positioned on the second clamp to fix positions of the first clamp and the second clamp, the first clamp comprising:
  - two semicircular sections connected by a first clamp hinge bolt, wherein a first semicircular clamp section, on an outer surface of the first semicircular clamp section, comprises a cable holder, including a divider, and a locking lid;
  - a plurality of pin holes on a first edge of the first clamp, wherein the first edge is configured to face downward when installing the pipe joint; and
  - a second clamp hinge bolt configured to be inserted into the first clamp, and wherein inserting the second clamp hinge bolt locks the first clamp.

15. The method of claim 14, further comprising a cable enclosure process, the cable enclosure process comprising:
- after installing the first clamp and the second clamp, rotating the first clamp to align cable holder of the first clamp with a cable;
- fixing a rotational position of the first clamp by using a clamp body locking element; and
- enclosing the cable into the cable holder.

16. The method of claim 15, wherein fixing the rotational position of the first clamp is performed after enclosing the cable into the cable holder.

17. The method of claim 15, wherein installing the clamp assembly is performed to form a pipe stack comprising a plurality of pipes and pipe joints, and wherein each of a first pipe joint and a last pipe joint comprises a clamp having a design different from the clamp assembly.

18. The method of claim 15, wherein the cable enclosure process is performed offshore immediately before installing the pipe and the clamp assembly into a well, and wherein preceding steps before the cable enclosure process are performed in advance at a different location.

\* \* \* \* \*